United States Patent
Barsotti et al.

(10) Patent No.: US 7,071,286 B2
(45) Date of Patent: Jul. 4, 2006

(54) COATING COMPOSITIONS WITH HIGH SOLIDS CONTENT FOR VEHICLE COATING

(75) Inventors: Robert J. Barsotti, Franklinville, NJ (US); Jos Huybrechts, Turnhout (BE); Leen Tanghe, Kapelleweg (BE)

(73) Assignee: E. I. duPont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/725,889

(22) Filed: Dec. 2, 2003

(65) Prior Publication Data

US 2005/0119443 A1    Jun. 2, 2005

(51) Int. Cl.
*C08G 63/02* (2006.01)

(52) U.S. Cl. .................. 528/271; 428/423.1; 525/410; 528/272

(58) Field of Classification Search ............. 428/423.1; 528/271, 272; 525/410
See application file for complete search history.

(56) References Cited

U.S. PATENT DOCUMENTS

| | | | |
|---|---|---|---|
| 3,354,100 A | | 11/1967 | Kuryla |
| 4,338,240 A | | 7/1982 | Mizutani et al. |
| 5,244,696 A | * | 9/1993 | Hazan et al. ............... 427/402 |
| 5,719,234 A | * | 2/1998 | Yabuta et al. ............... 525/101 |
| 6,180,175 B1 | * | 1/2001 | Saika et al. ................. 427/387 |
| 6,350,526 B1 | * | 2/2002 | Johnson et al. ............. 428/447 |
| 6,713,551 B1 | * | 3/2004 | Takahashi et al. .......... 524/500 |

FOREIGN PATENT DOCUMENTS

| | | |
|---|---|---|
| EP | 882 106 | 12/1998 |
| EP | 1 225 172 | 7/2002 |
| WO | WO 02/44234 A1 | 6/2002 |

OTHER PUBLICATIONS

European Search Report No. EP 04025735, Mailed: Mar. 15, 2005.

* cited by examiner

*Primary Examiner*—Terressa Boykin

(57) ABSTRACT

The invention is directed to coating compositions comprising:
  A) 20–80 wt-% of at least one orthoester compound having at least one non-cyclic orthoester group and at least one hydroxyl group per molecule, which compound is obtained by reacting
      a) at least one orthoester compound with
      b) at least one diol with a number average molecular weight (Mn) of 200–1000 g/mol, wherein solely diols are used having hydroxyl groups with different reactivity and having more than 3 carbon atoms between the hydroxyl groups,
  B) 0–40 wt-% of at least one hydroxy-functional binder and/or hydroxy-functional reactive diluent, different from component A) and
  C) 80–20 wt-% of at least one cross-linking agent with functional groups reactive with hydroxyl groups.

11 Claims, No Drawings

COATING COMPOSITIONS WITH HIGH SOLIDS CONTENT FOR VEHICLE COATING

BACKGROUND OF THE INVENTION

1. Field of the Invention

The invention relates to coating compositions based on compounds containing orthoester groups and cross-linking agents, which are in particular usable as clear coats or pigmented top coats.

2. Description of Related Art

The coatings conventionally used in vehicle coating and in particular in vehicle repair coating are two-component coatings based on hydroxy-functional binder components and polyisocyanate cross-linking agents. These coatings permit the production of high quality finishes, for example, with good chemical resistance and elevated mechanical or weathering resistance. One general problem with two-component coatings, especially in repair coating, is that it is often difficult to achieve a compromise between the requirement for elevated reactivity and thus rapid drying and the requirement for an adequate pot life. Measures which bring about elevated reactivity of the coating components, for example, appropriate modifications to the binder, in general inevitably result in a reduction of the coating's pot life, (pot life=time to double in viscosity).

EP-A-882 106, for example, describes compounds containing bicyclo orthoester and spiro orthoester groups which, together with appropriate cross-linking agents, can be formulated to yield coating compositions. The orthoesters contain latent, i.e. blocked hydroxyl groups, which can be liberated by hydrolysis. Deblocking of these groups proceeds under the influence of atmospheric humidity or added water and is catalyzed. Since the orthoesters themselves are stable and the hydroxyl groups are subsequently liberated under the influence of moisture and catalysis, the intention is to achieve a good balance between pot life and drying time. However, since moisture generally gains access via atmospheric humidity, one disadvantage of these systems is that cross-linking or initiation of the cross-linking reaction is dependent on the atmospheric humidity prevailing during application. Extremely high or low atmospheric humidity during application may result in irregularities in the coatings obtained. These compounds are also relatively complicated and costly to produce.

EP-A-1 225 172 furthermore describes cross-linkable coating compositions containing polyorthoesters. These polyorthoesters are produced by reacting non-cyclic orthoesters, for example, methyl orthoformate, ethyl orthoformate, methyl orthoacetate or ethyl orthoacetate, with alpha- and/or beta-glycols and further compounds comprising at least two hydroxy groups. These polyorthoester compounds have all of the hydroxyl groups blocked and the groups are deblocked under the influence of moisture with acidic catalysis, which in turn makes the cross-linking reaction dependent on ambient conditions during application of the coating composition, in particular, on relative atmospheric humidity. Moreover, coating compositions based on these polyorthoesters and based on polyisocyanates have a poor drying performance.

There is accordingly a requirement in vehicle repair coating for coating compositions based on hydroxy components and cross-linking components reactive therewith, which exhibit a good balance between pot life and reactivity or drying time and the cross-linking reaction of which is relatively independent of ambient/climatic conditions during application of the coating composition, in particular independent of relative atmospheric humidity. The coating compositions should furthermore exhibit an elevated solids content at the viscosity required for application, in particular spray application.

SUMMARY OF THE INVENTION

The present invention is directed to coating compositions comprising:

A) 20–80 wt-% of at least one orthoester compound having at least one non-cyclic orthoester group and at least one free hydroxyl group per molecule, which compound is obtained by reacting
   a) at least one orthoester compound with
   b) at least one diol with a number average molecular weight (Mn) of 200–1000 g/mol, preferably of 230–500 g/mol, wherein solely diols are used having hydroxyl groups of differing reactivity and having more than 3 carbon atoms between the hydroxyl groups, B) 0–40 wt-% of at least one hydroxy-functional binder and/or hydroxy-functional reactive diluent, different from component A) and C) 80–20 wt-% of at least one cross-linking agent with functional groups reactive with hydroxyl groups, wherein the proportions of component A), B) and C) add up to 100 wt-%.

It has surprisingly been found that, by using the compounds A) containing orthoester groups, in particular in combination with polyisocyanate cross-linking agents with free isocyanate groups, it is possible to obtain coating compositions with rapid drying and adequate pot life together with an elevated solids content at application viscosity.

DETAILED DESCRIPTION OF THE EMBODIMENTS

The invention is explained below in further detail.

The coating composition of the present invention comprises 20–80 wt.-%, preferably 30–70 wt.-% of at least one orthoester compound A) having at least one non-cyclic orthoester group and at least one free hydroxyl group in the molecule. The orthoester compound A) is the reaction product of the orthoester a) and the diol b).

The orthoester a) is a compound represented by the following Formula (I):

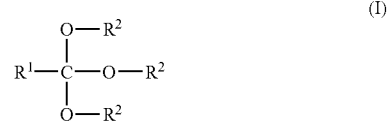

wherein $R^1$ represents a hydrogen atom or an alkyl group having 1 to 4 carbon atoms, and the three $R^2$'s may be the same or different and each represent an alkyl group having 1 to 4 carbon atoms. In Formula (I) described above, the alkyl groups having 1 to 4 carbon atoms represented by $R^1$ or $R^2$ may be linear or branched and includes, for example, methyl, ethyl, n-propyl, isopropyl, n-butyl, isobutyl and t-butyl.

Specific examples of the orthoester (a) include, for example, trimethyl orthoformate, triethyl orthoformate, tripropyl orthoformate, tributyl orthoformate, trimethyl orthoacetate, triethyl orthoacetate, trimethyl orthopropionate, triethyl orthoproprionate, trimethyl orthobutyrate and triethyl orthobutyrate. Among them, trimethyl orthoformate, triethyl orthoformate, trimethyl orthoacetate and triethyl orthoacetate are preferred. The orthoesters may be used alone or in combination of two or more kinds thereof.

The diol b) is a compound having two hydroxyl groups of different reactivity in the molecule. That means, that the following combinations of hydroxyl groups are possible: primary hydroxyl group and secondary hydroxyl group; primary hydroxyl group and tertiary hydroxyl group; secondary hydroxyl group and tertiary hydroxyl group. It is important, according to the invention, that the diol has a structure such that more than 3 carbon atoms are between the two hydroxyl groups. The diol b) has a number average molecular weight of 200 to 1000 g/mol, preferably of 230 to 500 g/mol and preferably a hydroxy number of 224 to 448 mg KOH/g.

Examples for suitable diols are reaction products of hydroxy carboxylic acids with at least one acid group and at least one hydroxyl group in the molecule and epoxy group containing compounds. The hydroxy carboxylic acids may be linear or branched. Preferably, they have 4–10, more preferably, 4–5 carbon atoms in the molecule. Preferred examples of hydroxy carboxylic acids are 2-hydroxy isobutyric acid and 2-hydroxy pivalic acid.

Epoxy group containing compounds are e.g. glycidyl ester of carboxylic acids, preferably of carboxylic acids with 4–13 carbon atoms in the acid molecule. Preferred examples of epoxy group containing compounds are glycidyl ester of versatic acid, glycidyl ester of pivalic acid. Other epoxy compounds include epoxies as ethylenoxide, propyleneoxide, butyleneoxide, cyclohexeneoxide and epoxy ethers as glycidyl ethers of butanol, cyclohexanol, phenyl and t-butyl phenyl.

Further suitable diols b) are reaction products of hydroxy carboxylic acids with at least one acid group and at least one hydroxyl group and linear or branched diols. Examples for hydroxy carboxylic acids are those mentioned above. Instead of the hydroxy carboxylic acid also hydroxy carboxylic acid esters can be used. Examples for suitable diols to be reacted with the hydroxy carboxylic acids and/or hydroxy carboxylic acid esters are linear or branched diols with 3–10, preferably 8 carbon atoms in the molecule, e.g. 2-ethyl-1,3-hexane diol, trimethyl pentanediol (mixed isomers).

Thereby the reactants to prepare the diols b) have to be selected in a way that the required hydroxyl groups of different reactivity and the required more than three carbon atoms between the hydroxyl groups are achieved in the diols b).

In producing the orthoester compound A) a blending ratio of the orthoester a) and the diol b) shall not specifically be restricted. In general, it is suitable to use a molar ratio diol b) to orthoester a) of 1:10 to 10:1, preferably, of 1:5 to 5:1 and more preferably, of 1:2 to 2:1. The orthoester compound A) of the present invention can be obtained by subjecting the two components a) and b) described above to condensation reaction. For example, it can suitably be produced by heating the components described above at a temperature falling in a range of usually room temperature to 250° C., preferable 70 to 200° C. for 1 to 20 hours, to subject them to condensation reaction, if necessary, in the presence of an organic solvent and a catalyst like an acid catalyst or metal based catalyst which promote transesterification.

The resultant orthoester compound A) contains at least one, preferable more than one latent (blocked) hydroxyl group in form of an orthoester group and at least one free hydroxyl group.

Optionally, the coating compositions of the present invention may contain up to 40 wt.-% of other hydroxy-functional binders and/or hydroxy-functional reactive diluents (component B) different from component A).

Examples of these other hydroxy-functional binders are those hydroxy-functional binders known to the person skilled in the art, which are used in the formulation of solvent based coating compositions. Examples of other hydroxy-functional binders which can be used are hydroxy-functional polyester, alkyd, polyether, polyurethane, polyepoxide and/or poly(meth)acrylate resins. These other hydroxy-functional binders can also be present in a modified form, for example, in the form of (meth)acrylated polyesters or (meth)acrylated polyurethanes. They can be used individually or mixed. The coating compositions can also contain low molecular hydroxy functional reactive diluents.

Component C) of the coating composition according to the invention comprises 20–80 wt.-% of at least one cross-linking agent which is capable of entering into a cross-linking reaction with component A) and the optionally present component B). Cross-linking agents which may be considered are those compounds with functional groups which are reactive towards hydroxyl groups. Examples of crosslinking agents are polyisocyanates with free isocyanate groups or with at least partially blocked isocyanate groups, polyepoxides, polyacetales, polyanhydrides, polycarboxylic compounds and alkoxy silane compounds. Polyisocyanates with free isocyanate groups are preferably used.

Examples of the polyisocyanates with free isocyanate groups are any number of organic polyisocyanates with aliphatically, cycloaliphatically, araliphatically and/or aromatically bound free isocyanate groups. The polyisocyanates are liquid at room temperature or become liquid through the addition of organic solvents. At 23° C. the polyisocyanates generally have a viscosity of 1 to 6,000 mPas, preferably above 5 and below 3,000 mPas. These polyisocyanates are familiar to the person skilled in the art and can be obtained commercially.

The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of the above that are particularly suitable are what are known as "paint polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight. Triisocyanates such as triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine.

The polyisocyanate cross-linking agents can be used individually or mixed.

The orthoester compound A), the hydroxy functional binder and/or reactive diluent B) and the crosslinking agent C), preferably the polyisocyanates, are used in such proportion that the equivalent ratio of blocked and unblocked hydroxyl groups of components A) and B) to the reactive groups, preferably the isocyanate groups, of the crosslinking agent C) can be 5:1 to 1:5 for example, preferably 3:1 to 1:3, and in particular preferably 1.5:1 to 1:1.5.

Curing reaction occurs between the hydroxyl groups of component A) and component B) and the latent blocked hydroxyl groups of component A) on the one hand and the reactive groups, preferably the isocyanate groups, of the crosslinking agent C) on the other hand. The deblocking of the latent blocked hydroxyl groups of the orthoester compound A) takes place under the influence of water in the form of, e.g., moisture from the air or added water. This deblocking is preferably catalyzed by a first catalyst selected from the group of Lewis acids, such as, $AlCl_3$, $SbCl_5$, $BF_3$, $BCl_3$, $FeCl_3$, $FeBr_3$, $SnCl_4$, $TiCl_4$, $ZnCl_2$ and $ZrCl_4$ and organic complexes thereof, e.g., $BF_3$ $Et_2O$, $BF_3$—$2CH_3COOH$, $BF_3$—$2H_2O$, $BF_3$—$H_3PO_4$, $BF_3$—$(CH_3)_2O$, $BF_3$—THF, $BF_3$—$2CH_3OH$, $BF_3$—$2C_2H_5OH$ and $BF_3$—$C_6H_5CH_2$ and Bronsted acids. Preferably, use is made of Bronsted acids having a pKa<6, such as a mono- or dialkyl phosphate, a carboxylic acid having at least one chlorine and/or fluorine atom, an alkyl or aryl sulphonic acid or an (alkyl)phosphoric acid, more particularly methane sulphonic acid, paratoluene sulphonic acid, optionally, substituted naphthalene sulphonic acids, dodecyl benzene sulphonic acid, dibutyl phosphate, trichloracetic acid, phosphoric acid, and mixtures thereof. The effective amount of those catalysts may be 0.01–5.00 wt.-%, based on the orthoester compound A).

The reaction of the hydroxyl groups and deblocked hydroxyl groups of component A) and the hydroxyl groups of component B) with the reactive groups, preferably the isocyanate groups, of the crosslinking agent C) takes preferably place under the influence of a second catalyst. Such catalysts are known to the skilled person.

Example for those catalysts are: for polyisocyanates: organic metallic salts, such as dibutyl tin dilaurate, zinc naphthenate and compounds containing tertiary amino groups, such as triethylamine; for polyepoxy compounds: para-toluene sulphonic acid and dodecyl benzene sulphonic acid; for polycarboxylic compounds: dodecyl benzene sulphonic acid, for polyanhydride compounds: organotin compounds; and for alkoxysilane compounds: organotin compounds, phosphoric acid, paratoluene sulphonic acid, dodecyl benzene sulphonic acid.

The catalyst for the hydrolysis of the orthoester groups and the catalyst for the curing reaction may be used together in a mixture or in separate components.

The coating compositions, according to the invention, contain organic solvents. The solvents may originate from the preparation of the binders or they may be added separately. They are organic solvents typical of those used for coatings and well known to the skilled person.

The coating compositions, according to the invention, can contain pigments and/or fillers. All colour and/or special effect-giving pigments of organic or inorganic type used in paints are suitable for pigments. Examples of inorganic or organic colour pigments are titanium dioxide, micronised titanium dioxide, iron oxide pigments, carbon black, azo pigments, phthalocyanine pigments, quinacridone or pyrrolopyrrole pigments. Examples of special effect pigments are metal pigments for example from aluminium or copper, interference pigments, such as, for example, aluminum coated with titanium dioxide, coated mica, graphite effect pigments. Examples of fillers are silicon dioxide, barium sulphate, talcum, aluminium silicate, magnesium silicate.

The coating compositions can contain usual additives. These additives are additives usually used in the paint industry. Examples of such additives are light stabilizers, for example, based on benztriazoles and HALS compounds, flow control agents based on (meth)acrylic homopolymers or silicon oils, rheology-influencing agents, such as highly disperse silicic acid or polymeric urea compounds, thickeners, such as cross-linked polycarboxylic acid or polyurethanes, anti-foaming agents, wetting agents. The additives are added in the usual amounts familiar to the person skilled in the art.

Either transparent or pigmented coating compositions can be produced.

The coating compositions, according to the invention, may be used, e.g., as a two-component or three-component system. In the case of a two-component system, one component may comprise the orthoester compound A), the optionally present hydroxy-functional component B) and optionally, a catalyst for the curing reaction and the second component may comprise the crosslinking agent (component C) and the catalyst for the hydrolysis of the blocked hydroxyl groups of component A). In the case of a three-component system one component may comprise the orthoester compound A) and the optionally present hydroxy-functional component B), the second compound may comprise the crosslinking agent (component C) and the third component may comprise the catalyst or the catalyst mixture.

The coating compositions, according to the invention, can be applied using known methods, in particular by spray application. The coating compositions obtained can be cured at room temperature or forced at higher temperatures, for example, up to 80° C., preferably at 20 to 60° C. They can, however, even be cured at higher temperatures of, for example, 80 to 160° C.

The coating compositions, according to the invention, are suitable for automotive and industrial coatings. In the automotive coatings sector, the coatings can be used for both vehicle production line painting and vehicle and vehicle part refinishing. For vehicle production line painting stoving temperatures of 80 to 140° C., for example, are used, preferably 110 to 130° C. For refinishing curing temperatures of for example 20° C. to 80° C., in particular 40 to 60° C. are used.

The coating compositions, according to the invention, can be formulated, for example, as pigmented topcoats or as transparent clear coats and used in the manufacture of the outer pigmented topcoat layer of a multilayer coating or in the production of the outer clear coat layer of a multilayer coating. The present invention also concerns the use of the coating compositions, according to the invention, as topcoat coatings and as clear coatings as well as a method for producing multilayer coatings, the pigmented topcoat and transparent clear coat layers of multilayer coatings, in particular, being manufactured from the coating compositions, according to the invention.

The coating compositions in the form of a pigmented topcoat can be applied, for example, to normal one-component or two-component filler layers. However, the coatings, according to the invention, can also be applied and cured as a filler layer, for example, on normal primers, for example, two-component epoxide primers or on electrodeposition primers.

The coating compositions in the form of transparent clear coats can be applied, for example, using the wet-in-wet process on solvent-based or aqueous colour and/or effect-giving basecoat layers. In this case, the colour and/or effect-giving basecoat layer is applied to a substrate, precoated if necessary, in particular, to precoated vehicle bodies or parts thereof, prior to the application of the clear coating layer from the clear coat, according to the invention. Following a drying period, if allowed for, both layers are cured together. Thus, for vehicle production line painting, drying can take place, for example, at 20 to 80° C. and for refinishing for 15 to 45 minutes at room temperature, depending on relative air humidity.

The coating compositions, according to the invention, are used to advantage in a multilayer coating to produce pigmented topcoat layers and transparent clear coat layers. The topcoat and clear coat layers possess good resistance to mechanical and weathering influences and exhibit good chemical resistance. The coating compositions, according to the invention, have a sufficiently high solids content at spray viscosity, for example, a solids content of up to 75–80% by weight. The coating compositions show good drying properties and sufficient pot life. Good quality coatings are obtained independently of the ambient conditions during application, in particular, relative atmospheric humidity.

The following Examples are intended to illustrate the invention in greater detail.

All parts and percentages are on a weight basis unless otherwise indicated. Molecular weights are determined by gel permeation chromatography using a polystyrene standard.

EXAMPLES

Example 1

A) Preparation of a Diol with Two Hydroxyl Groups (One Secondary, One Primary) and More than 3 Carbon Atoms Between the Hydroxyl Groups.

A reaction vessel fitted with a stirrer, heating mantle, water condenser was charged with 118 grams of 2-hydroxy pivalic acid and 161 grams of glycidyl pivalate. The contents were heated to 130–140° C. till the 2-hydroxy pivalic acid was dissolved. The batch exothermed at about 150° C. till 160° C. and the reactor was cooled till 140° C. The batch was held till the acid value dropped below 2.

The reaction product had a viscosity of V measured by Gardner-Holdt method at 100% solids and an acid value of 1.4 mg KOH/g. The molecular weight distribution measured by Gel Permeation Chromatography was Mn/Mw=370/390 and the mass spectra confirmed the structure below.

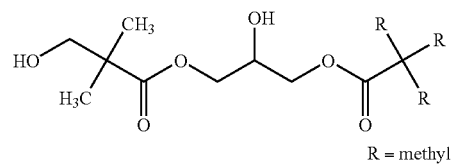

R = methyl

B) Preparation of a Star Orthoester

A reactor equipped as in step A) as well as with a packed column filled with glass beads and a distillation vessel was charged with 837 grams of the diol of step A) and 132 grams of trimethyl orthoacetate. The contents of the reactor were slowly heated to 165° C. reactor temperature while methanol was stripped via the packed columns in the distillation vessel. The reaction was continued till 106 grams of methanol were stripped off which corresponded to about 60% of the theoretical amount assuming all the primary hydroxyl groups of the diol of step A) reacted to an orthoester.

The reaction product had a viscosity of X+½ measured by Gardner-Holdt at 100% solids. The molecular weight distribution measured by Gel Permeation Chromatography was Mn/Mw=500/710 and the mass spectra confirmed the presence of the oligomer structures below as well as higher molecular weight species.

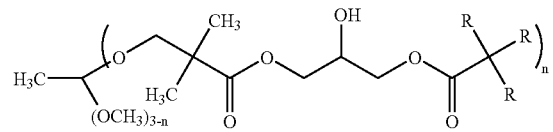

R=methyl; n=1, 2 or 3 (mixture of isomers)

Example 2

A) Preparation of a Diol with Two Hydroxyl Groups (One Primary, One Secondary) and More than 3 Carbon Atoms Between the Hydroxyl Groups.

The procedure of example 1 was repeated with 250 grams of Cardura E10 (Glycidyl ester of Versatic acid, available from Resolution) and 118 grams of 2-hydroxy pivalic acid.

The reaction product had a viscosity of R measured by Gardner-Holdt method at 100% solids and an acid value of 1.8 mg KOH/g. The molecular weight distribution measured by Gel Permeation Chromatography was Mn/Mw=440/460 and the mass spectra confirmed the structure below.

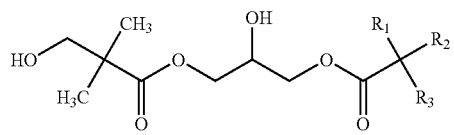

$R_1$, $R_2$, $R_3$ : total 8 carbons
(mixture of isomers)

R1, R2 being methyl and R3 hexyl and isomers leading to branching wherein the C atom linked to COO is a t-C atom B) Preparation of a Star Orthoester The procedure of example 1 was repeated using 126 grams of trimethyl orthoacetate and 1104 grams of the diol of step A). The reaction contents were gradually heated to 200° C. and about 75% of the theoretical amount of methanol was distilled off.

The reaction product had a viscosity of Z4 measured by Gardner-Holdt at 100% solids. The molecular weight distribution measured by Gel Permeation Chromatography was Mn/Mw=630/910 and the mass spectra confirming the presence of the oligomer structures below as well is higher molecular weight species.

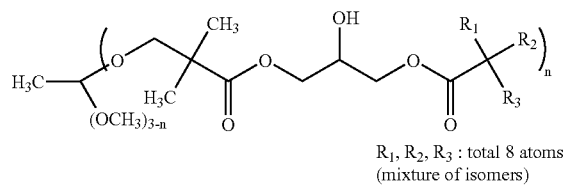

R1, R2, R3 : total 8 atoms (mixture of isomers)

R1, R2 being methyl and R3 hexyl and isomers leading to branching wherein the C atom linked to COO is a t-C atom; n=1, 2 or 3 (mixture of isomers)

Comparative Example 1

Preparation of a Star Orthoester from a Diol with Three Carbon Atoms Between the Two Hydroxyl Groups Differing in Reactivity.

The procedure of step B) of example 1 was repeated with 126 grams of trimethyl orthoacetate and 438 grams of 2-ethyl 1,3-hexanediol. Heating till 175° C. resulted in about 92% methanol stripped off.

The reaction product had a viscosity of B measured by Gardner-Holdt at 100% solids and a molecular weight distribution measured by Gel Permeation Chromatography of 310/320. The mass spectra indicated cyclic orthoesters were formed.

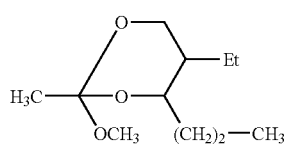

Et=ethyl

Example 3

A) Preparation of a Diol with Two Hydroxyl Groups (One Secondary, One Tertiary) and More than 3 Carbon Atoms Between the Hydroxyl Groups.

In a reactor equipped as in the forgoing examples 146 grams of 2-ethyl 1,3-hexanediol were charged together with 118 grams of 2-hydroxyisobutyric acid and 0.13 grams of dibutyltin oxide. The reactor contents were heated to 228° C. while stripping methanol. After stripping about 83% of the theoretical amount of methanol the reactor contents were cooled down.

The reaction product had a viscosity of E measured by Gardner-Holdt at 100% solids. The molecular weight distribution measured by Gel Permeation Chromatography was Mn/Mw=180/180 and the mass spectra confirmed the structure below.

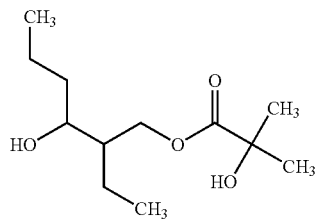

B) Preparation of a Star Orthoester

The procedure of step B) of example 1 was repeated using 120 grams of trimethyl orthoacetate and 696 grams of the diol of step A). The reaction contents were gradually heated to 200° C. and about 76% of the theoretical amount of methanol was distilled off.

The reaction product had a viscosity of A measured by Gardner-Holdt at 100% solids. The molecular weight distribution measured by Gel Permeation Chromatography was Mn/Mw=330/360 and the mass spectra confirmed the presence of the oligomer structures below as well as higher molecular weight species.

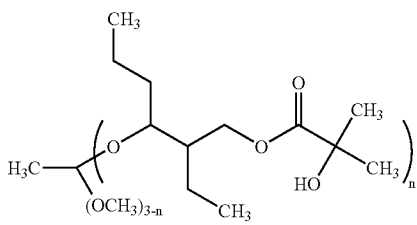

n=1,2 or 3 (mixture of isomers)

Example 4

Clear Coat Composition Based on Star Orthoester of Example 1:

A clear coat was prepared by mixing 20 parts of the orthoester of example 1, 5 parts of ethyl 3-ethoxypropionate, 5 parts of ethylene glycol monobutyl ether acetate, 0.106 parts of Byk® 333, 0.083 parts of Byk® 361, 0.42 parts of a 1% dibutyltin dilaurate solution in xylene and 0.208 parts of dodecyldimethyl amine. This clear coat was mixed with a blend of 19.06 parts Desmodur®) N3600 (1,6-hexamethylenediisocyanate based polyisocyanate of Bayer) and 4.81 parts of Vestanat T1890L (cyclotrimer of isophorone diisocyanate available from Hüls) followed by the addition of 0.31 parts of Nacure XP-221 (dodecylbenzene sulfonic acid, catalyst).

The clear coat was sprayed on primed metal panels wet in wet over a commercial dark blue solvent based basecoat (Centari® 6000 from Dupont Performance Coatings) after which the coating was baked for 30 minutes at 60° C. The appearance of the panels was good and the hardness reached measured by Fisher was 3.5 knoops after one hour and 6.8 knoops after one week. The clear coat was tack free after 5 minutes and the tape time was good recovered. The pot life of the clear coat formulation (doubling in spray viscosity) was about 30 minutes and the time to gel 18 hours.

Comparative Example 2

Clear Coat from Orthoester of Comparative Example 1:

A clear coat was prepared as in example 5 above, but using the orthoester of comparative example 1. The clear coat did not have any drying performance. The surface of the clear coating remained tacky after baking for 30 minutes at 60° C.

Example 5

Clear Coat Composition Based on Star Orthoester of Example 1

+

Comparative Example 3

Clear Coat Composition Based on Diol of Example 1A

|  | Example 5 | Comparative Ex. 3 |
|---|---|---|
| Portion 1 | | |
| Diol (Example 1A) | 0 | 20 |
| Orthoester (Example 1) | 20 | 0 |
| Butyl Acetate | 12.4 | 13.1 |
| BYK ® - 301 (20%) | 0.48 | 0.48 |
| Di Butyl Tin Dilaurate (1%) | 2.4 | 2.4 |
| Portion 2 | | |
| Tolonate ® HDT | 27.85 | 27.85 |
| Portion 3 | | |
| Nacure XP - 221 | 0.68 | 0 |

For each of the Examples, the constituents of Portion 1 were charged into a mixing vessel in the order shown above and mixed, then Portion 2 and 3 were thoroughly mixed with Portion 1 to form the clear coat. Each of the coating compositions were applied with a doctor blade over both a phosphated cold roll steel panel primed with a layer of PowerCron® Primer supplied by PPG, Pittsburgh, Pa., and a Tedlar® film. The coatings were applied to a dry coating thickness of 50 microns and were baked for 20 minutes at 60° C. The coatings on the steel panel were tested in place, those on the Tedlar® film were removed and tested as free films. Then the panels were tested using the test set forth in the following Table.

|  | Example 5 | Comparative Ex. 3 |
|---|---|---|
| Weight Solids (theoretical) | 75% | 75% |
| ICI cone & plate Viscosity (in cP) | 49 | 46 |
| Time to gel | >24 hours | 50 minutes |
| Swell ratio | | |
| 1 day after bake | 2.16 | 2.09 |
| 30 days after bake | 1.93 | 1.94 |
| Fischer hardness | | |
| Out of oven | 70 | 33 |

-continued

|  | Example 5 | Comparative Ex. 3 |
|---|---|---|
| (on cool down) | | |
| 1 day after bake | 83 | 45 |
| 30 days after bake | 112 | 84.5 |

The data shows that the clear coat of example 5, according to the invention, has equivalent or better cured properties (swell ratio and hardness) and a much improved time to gel than the clear coat of comparative example 3. The Viscosity and solids data indicate that the orthoesters of this invention can be used to make very low VOC coatings.

Example 6

Clear Coat Composition Based on Star Orthoester of Example 1

A clear coat was made using the orthoester from example 1 with a different isocyanate activator.

| Portion 1 | |
|---|---|
| Orthoester (from Example 1) | 26.67 |
| Butyl Acetate | 9.52 |
| BYK - 301 (20%) | 0.77 |
| Di butyl tin dilaurate (10%) | 1.56 |
| Portion 2 | |
| Tolonate ® HDT | 32.54 |
| IPDI-T1890L | 26.57 |
| Portion 3 | |
| Nacure XP-221 | 1.1 |

The theoretical weight solids of this clear coat was 75%. The measured weight solids was 79.82. The gallon weight was 8.84. Thus, the measured VOC was 1.78 lbs/gallon. This clearly shows that a very low VOC (<2.1 lbs/gallon) could be achieved with the orthoesters of this invention.

Example 7,8

Clear Coat Composition Based on Star Orthoester of Example 1

Two clearcoats were made using the orthoester from example 1 with different catalyst and Isocyanate activators.

|  | Ex 7 | Ex 8 |
|---|---|---|
| Portion 1 | | |
| Orthoester (from Ex 1) | 20 | 20 |
| Butyl Acetate | 9.37 | 9.37 |
| 20% BYK ® - 301 | 0.45 | 0.45 |
| Di butyl tin dilaurate (10%) | 0.45 | 0.45 |
| Diethylene triamine in Xylene (10%) | 1.12 | 0 |
| Dimethyl dodecyl amine in Methyl amyl ketone (10%) | 0 | 2.25 |
| Portion 2 | | |
| Tolonate ® HDT | 15.43 | 15.43 |
| IPDI-T1890L | 13.51 | 13.51 |

-continued

|  | Ex 7 | Ex 8 |
|---|---|---|
| Portion 3 | | |
| Acetic Acid | 1.28 | 1.28 |

For each of Examples 7 and 8 the constituents of Portion 1 were charged into a mixing vessel in the order shown above and mixed, then Portion 2 and 3 were thoroughly mixed with Portion 1 to form each of the Examples. Each of the coating compositions were applied with a doctor blade over both a phosphated cold roll steel panel primed with a layer of PowerCron® Primer supplied by PPG, Pittsburgh, Pa., and a Tedlar® film. The coatings were applied to a dry coating thickness of 50 microns and were baked for 20 minutes at 60° C. The coatings on the steel panel were tested in place, those on the Tedlar® film were removed and tested as free films. Then the panels were tested using the test set forth in the following Table.

|  | Example 7 | Example 8 |
|---|---|---|
| Weight Solids (theoretical) | 75% | 75% |
| Water Spot rating | | |
| Out of oven (on cool down) | 7.5 | 8 |
| 1 day after bake | 7.5 | 8 |
| MEK Rub rating | | |
| Out of oven (on cool down) | 600 | 600 |
| 1 day after bake | 750 | 700 |
| Persoz Hardness | | |
| Out of oven (on cool down) | 128 | 123 |
| 1 day after bake | 111 | 170 |
| Fischer Hardness | | |
| Out of oven (on cool down) | 40 | 28.9 |
| 1 day after bake | 113 | 108.4 |
| 7 days after bake | 153 | 124 |
| Viscosity in seconds using Zahn #2 cup | | |
| Initial | 24.5 | 22.4 |
| 30 minutes after activation | 33.4 | 27.4 |
| 60 minutes after activation | 44.1 | 32.7 |
| 90 minutes after activation | 55 | 40.7 |
| 120 minutes after activation | 65.1 | 49.4 |
| Pot Life (min) (Time to double in viscosity) | 60–90 | 90–120 |

These results shown that the Orthoesters of this invention can be used to make very low VOC, low viscosity clearcoats which have very good hardness, cure and sprayable pot life.

Example 9

Clear Coat Composition Based on Star Orthoester of Example 2

A clearcoat was made using the orthoester from example 2.

|  | Ex 9 |
|---|---|
| Portion 1 | |
| Orthoester (from Ex 2) | 20 |
| Butyl Acetate | 10.7 |
| 20% BYK ® - 301 | 0.41 |
| Di butyl tin dilaurate (1%) | 2.07 |
| Portion 2 | |
| Tolonate ® HDT | 21.34 |
| Portion 3 | |
| Nacure XP - 221 | 0.59 |

A film was cast and cured as per clearcoat of Example 5.

|  | Ex 9 |
|---|---|
| Weight Solids (theoretical) | 75% |
| ICI cone & plate Viscosity (in cP) | 49 |
| Time to gel | >24 hours |
| Swell ratio | |
| 1 day after bake | 2.29 |
| 30 days after bake | 2.09 |
| Fischer hardness | |
| Out of oven (on cool down) | 18 |
| 1 day after bake | 18 |
| 30 days after bake | 20.7 |

This example shows that the orthoester based on example 2 can make low VOC clears which will cure under the conditions of this testing with acceptable cure properties and hardness and have much better/improved pot life than the clear of comparative example 3.

BYK® 333: flow additive (BYK-CHEMIE)

BYK® 361: flow additive (BYK-CHEMIE)

BYK® 301: flow additive in Propylene glycol monomethyl ether acetate (BYK-CHEMIE, Wallingford, Conn.)

Di butyl tin dilaurate: in methyl ethyl ketone (Elf-Atochem North America, Inc. Philadelphia, Pa.)

Tolonate® HDT: Isocyanurate trimer of hexamethylene diisocyanate (RHODIA INC., Cranbury, N.J.)

Nacure XP-221: Dodecyl benzene sulfonic acid catalyst (King Industries)

IPDI-T1890L—Trimer of Isophorone Diisocyanate (Degussa Corp/Coatings & Colorants)

Testing Methods

Swell Ratio

The swell ratio of a free film (removed from a sheet of TPO—thermoplastic olefin) was determined by swelling the film in methylene chloride. The free film was placed between two layers of aluminum foil and using a LADD punch, a disc of about 3.5 mm in diameter was punched out of the film and the foil was removed from the film. The diameter of the unswollen film ($D_o$) was measured using a microscope with a 10× magnification and a filar lens. Four drops of methylene chloride were added to the film and the film was allowed to swell for a few seconds and then a glass slide was placed over the film and the swollen film diameter ($D_s$) was measured. The swell ratio was then calculated as follows:

$$\text{Swell Ratio}=(D_s)^2/(D_o)^2$$

Persoz Hardness Test

The change in film hardness of the coating was measured with respect to time by using a Persoz hardness tester Model No. 5854 (ASTM D4366), supplied by Byk-Mallinckrodt, Wallingford, Conn. The number of oscillations (referred to as Persoz number) were recorded.

Hardness (Fischer)

Hardness was measured using a Fischerscope® hardness tester (the measurement is in Newtons per square millimeter).

MEK Solvent Resistance Test

A coated panel is rubbed (100 times) with an MEK (methyl ethyl ketone) soaked cloth using a rubbing machine and any excess MEK is wiped off. The panel is rated from 1–10. Rating of 10 means no visible damage to the coating, 9 means 1 to 3 distinct scratches, 8 means 4 to 6 distinct scratches, 7 means 7 to 10 distinct scratches, 6 means 10 to 15 distinct scratches with slight pitting or slight loss of color, 5 means 15 to 20 distinct scratches with slight to moderate pitting or moderate loss of color, 4 means scratches start to blend into one another, 3 means only a few undamaged areas between blended scratches, 2 means no visible signs of undamaged paint, 1 means complete failure, i.e., bare spots are shown. The final rating is obtained by multiplying the number of rubs by the rating.

Water Spot

Water spot rating is a measure of how well the film is crosslinked early in the curing of the film. If water spot damage is formed on the film, this is an indication that the cure is not complete and further curing of the film is needed before the film can be wet sanded or buffed or moved from the spray both. The water spot rating is determined in the following manner.

Coated panels are laid on a flat surface and deionized water was applied with a pipette at 1 hour timed intervals. A drop about ½ inch in diameter was placed on the panel and allowed to evaporate. The spot on the panel was checked for deformation and discoloration. The panel was wiped lightly with cheesecloth wetted with deionized water, which was followed by lightly wiping the panel dry with the cloth. The panel was then rated on a scale of 1 to 10. Rating of 10 best—no evidence of spotting or distortion of discoloration, rating 9—barely detectable, rating 8—slight ring, rating 7—very slight discoloration or slight distortion, rating 6—slight loss of gloss or slight discoloration, rating 5—definite loss of gloss or discoloration, rating of 4—slight etching or definite distortion, rating of 3—light lifting, bad etching or discoloration, rating of 2—definite lifting and rating of 1—dissolving of the film.

Viscosity

Measured on an ICI cone & plate viscometer in centipoise (cP) at 10,000 sec-1 shear rate or measured in seconds using a Zahn #2 viscosity cup.

Weight Solids Test

The weight solids are measured using pre-weighed Aluminum dishes.

1) 2–4 milliliters of Aromatic 100 solvent from Exxon-Mobil Chemical Company are placed in the aluminum dish.
2) 0.2–0.4 grams of the experimental material is weighed into the dish containing the solvent.
3) The multi-component clear coating is allowed to sit for 60 minutes at room temperature.
4) The sample is then placed in an oven at 110+/−5° C. for 60 minutes.
5) The sample is removed from the oven, allowed to cool at room temperature and weighed.
6) The weight solids is calculated as:

$$\text{Weight solids} = \frac{\text{Weight of sample in } Al \text{ dish after oven heating} \times 100}{\text{Initial experimental sample weight}}$$

We claim:

1. A coating composition comprising:
   A) 20–80 wt-% of at least one orthoester compound having at least one non-cyclic orthoester group and at least one free hydroxyl group per molecule, which compound is obtained by reacting
      a) at least one orthoester compound with
      b) at least one diol with a number average molecular weight (Mn) of 200–1000 g/mol, wherein solely diols are used having hydroxyl groups with different reactivity and having more than 3 carbon atoms between the hydroxyl groups and wherein the diol is selected from the group consisting of the reaction product of hydroxy carboxylic acids with at least one acid group and at least one hydroxyl group in the molecule and epoxy group containing compounds, the reaction product of hydroxyl carboxylic acids with at least one acid group and at least one hydroxyl group and linear diols or branched diols, and the reaction product of hydroxy carboxylic acid esters and linear diols or branched diols;
   B) 0–40 wt-% of at least one hydroxy-functional binder and/or hydroxy-functional reactive diluent, different from component A) and
   C) 80–20 wt-% of at least one cross-linking agent with functional groups reactive with hydroxyl groups, wherein the proportions of component A), B) and C) add up to 100 wt-%.

2. The coating composition according to claim 1, wherein the at least one diol b) has a number average molecular weight (Mn) of 230–500 g/mol.

3. The coating composition according to claim 1, wherein the orthoester compound a) is a compound selected from the group consisting of trimethyl orthoformate, triethyl orthoformate, trimethyl orthoacetate, triethyl orthoacetate, and mixtures thereof.

4. The coating composition according to claim 1, wherein the hydroxy carboxylic acid with at least one acid group and at least one hydroxyl group in the molecule is a compound selected from the group consisting of 2-hydroxy isobutyric acid, 2-hydroxy pivalic acid and mixtures thereof.

5. The coating composition according to claim 1, wherein the epoxy group containing compounds is a compound selected from the group consisting of glycidyl ester of versatic acid, glycidyl ester of pivalic acid and mixtures thereof.

6. The coating composition according to claim 1, wherein the linear or branched diol is a diol with 3–10 carbon atoms in the molecule.

7. The coating composition according to claim 1, wherein component B) is a compound selected from the group consisting of hydroxy-functional poly(meth)acrylates, hydroxy-functional polyesters, hydroxy-functional polyurethanes and any mixtures thereof.

8. The coating composition according to claim 1, wherein component C) comprise polyisocyanates with free isocyanate groups.

9. A process for the multilayer coating of a substrate to form a multilayer structure thereon, the process comprising applying a coating composition according to claim 1 to the substrate or to a layer of the multilayer structure thereby forming at least one layer of the multilayer structure.

10. A process for the multilayer coating of a substrate to form a multilayer structure thereon, the process comprising applying a coating composition according to claim 1 to the substrate or to a layer of the multilayer structure thereby forming a clear coat layer of the multilayer structure.

11. The process according to claim 9 or 10, wherein the substrate comprises vehicles or vehicle parts.

* * * * *